United States Patent [19]
Akerberg

[11] Patent Number: 4,709,401
[45] Date of Patent: Nov. 24, 1987

[54] METHOD OF SETTING RADIO TRANSMITTERS FOR SYNCHRONOUS RADIO TRANSMISSION

[75] Inventor: Dag E. Akerberg, Jarfalla, Sweden

[73] Assignee: Telefonaktiebolaget LM Ericsson, Stockholm, Sweden

[21] Appl. No.: 912,983

[22] Filed: Sep. 29, 1986

Related U.S. Application Data

[63] Continuation-in-part of Ser. No. 626,868, Jun. 29, 1984, abandoned.

[30] Foreign Application Priority Data

Sep. 12, 1982 [SE] Sweden ............................... 8207054
Jul. 12, 1983 [WO] PCT Int'l Appl. ... PCT/SE83/00435

[51] Int. Cl.[4] .......................... H04B 1/00; H04B 7/14

[52] U.S. Cl. ........................................ 455/51; 455/18; 455/57; 340/825.44

[58] Field of Search ....................... 455/18, 51, 53, 57, 455/75; 340/825.44

[56] References Cited

U.S. PATENT DOCUMENTS

| | | | |
|---|---|---|---|
| 4,208,630 | 6/1980 | Martinez | 455/75 |
| 4,255,814 | 3/1981 | Osborn | 455/51 |
| 4,411,007 | 10/1983 | Rodman | 455/51 |
| 4,578,815 | 3/1986 | Persinotti | 455/51 |

*Primary Examiner*—Robert L. Griffin
*Assistant Examiner*—Curtis Kuntz
*Attorney, Agent, or Firm*—Roberts, Spiecens & Cohen

[57] ABSTRACT

In a radio paging system wherein paging calls are initiated by a central radio station and sent over lines to subordinate radio stations for transmission to paging devices, the subordinate stations are synchronized to transmit paging messages by introducing time delays between reception of a message from the central radio station before transmission, the time delays being functions of the message transmit times via the lines to the various other stations as well as the radio propogation time between the other stations.

2 Claims, 8 Drawing Figures

SUBORDINATE STATION 2

PRIMARY OR SECONDARY STATION IN DELAY ADJUSTMENT MODE

METHOD OF SETTING RADIO TRANSMITTERS FOR SYNCHRONOUS RADIO TRANSMISSION

REFERENCE TO OTHER APPLICATIONS

This is a continuation-in-part of application Ser. No. 626,868 filed June 29, 1984 now abandoned.

FIELD OF THE INVENTION

The present invention relates to a method of setting radio transmitters for synchronous radio transmission and an apparatus for carrying out a part of the method.

BACKGROUND

For transmitting short messages by radio, particularly messages containing personal paging calls, it is usual to use a large number of radio transmitters, each with a limited range, these transmitters being adapted for synchronous radio transmission, i.e. all of the transmitters send the same message with the same frequency. The transmission is of the binary frequency modulation (frequency shifting keying, FSK), type and the transmitters are further adapted for sending the message bits simultaneously.

In known installations for sending personal paging calls the method of transmission is normally: transmission on a line of a message from a central station to all radio stations simultaneously, transmission of the message by radio from all radio stations, differences in propogation time on different lines first being compensated, so that the message is transmitted simultaneously from all the transmitters of the radio stations. An example of a system for nation-wide transmission of personal paging calls is described in "Final Report of the British Post Office Code Standardisation Advisory Group (POCSAG)", London 1978. A method of providing simultaneousness in the transmission of the message with use of time signals sent by broadcasting is also described in EP-A-0042144.

When the same message is sent by radio from several transmitters simultaneously, it is unavoidable that some receivers will receive the transmission from two radio transmitters. If the radio transmitters have exactly the same frequency, their field strengths may be combined to an increased field strength and good reception obtained, but in another place approximately a quarter wavelength away, their field strengths can counteract each other so that reception is made impossible. The disadvantage of fading field strength in certain places, standing waves, is mitigated by the frequencies of two adjacent transmitters being given a small offset. Instead of quite zones, beats will then occur with the frequency difference, which can be of the order of magnitude 500 Hz, while the nominal frequency may be 150 MHz, for example. The beats affect the ability of receiving the separate binary characters in the message, for which reason the bit frequency in the transmission should not exceed the beat frequency.

The true carrier frequency of the transmitters may deviate from the selected frequency by 50 Hz at most. The frequency stability requirement is thus high, and it has so far been met by using high-stability transmitters or by transmitting signals on a radio link for synchronizing the carrier frequency of the transmitters. Both methods require expensive installations.

In a receiver which is situated such that the transmission from two transmitters is received by it, the separate characters must arrive simultaneously, or otherwise there will be uncertainty as to when the character begins and ends. It is considered that the uncertain part of a character should not exceed 20% of the character length, and with a character rate of, for example, 512 bits/s applicable for the mentioned POCSAG system the uncertainty may be a maximum of 250 microseconds.

Radio receivers for the reception of code personal paging calls are described, inter alia, in the U.S. Pat. No. 3,835,394.

SUMMARY OF THE INVENTION

An object of the present invention is to provide a method introducing a delay for each radio transmitter adapted such that all transmitters send their characters with a time difference lying within the tolerance limits of the system. The insertion of delay and synchronization takes place in each particular radio transmitter closest to the central station and is spread like waves to stations, and it is carried out progressively so that it begins in the transmitters farther and farther away from the central station. Thus a common time signal transmitter is superflous.

BRIEF DESCRIPTION OF THE FIGURES OF THE DRAWING

Other objects, features and advantages of the invention will be apparent from the following detailed description when read with the accompanying drawing wherein.

DETAILED DESCRIPTION OF PREFERRED EMBODIMENTS

There will be described below how the invention is applied to an installation, selected as an example, for personal paging with the aid of radio signals. In certain respects, the installation is implemented as described in the mentioned POCSAG report, namely, the carrying frequency of the radio signals is about 150 MHz, the frequency offset between transmitters is 500 or 1000 Hz, the frequency deviation is permitted to be at most 50 Hz, the transmission is modulated with two frequencies having a difference of 9 kHz, and the time difference for characters sent from different transmitters is permitted to be at most 250 microseconds.

The invention may also be applied to installations for which other specifications than the one illustrated here apply.

Figure 1:
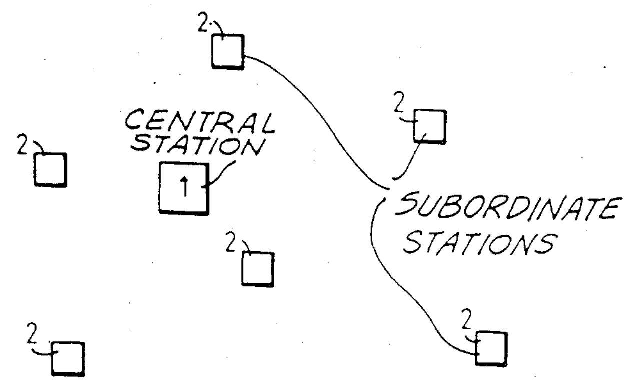
FIG. 1 illustrates an installation with a central station and a number of subordinate radio stations.

It is typical for installations for sending personal paging calls, and also applicable to the installation used in the embodiment, to have a central station 1 as illustrated in FIG. 1. The transmission of personal paging calls in an extensive area is administered by the station, from which such calls are sent out by radio to paging receivers within the range of the station. The calls are also sent by a line to subordinate radio stations 2 for retransmission to areas where the central station radio transmission cannot be comprehended.

The subordinate radio stations 2 are disposed such as to send the same call message as the central station 1, and to send it simultaneously with the sending from the central station and on the same radio frequency, or on a frequency with a preselected offset from this frequency.

Figure 2:
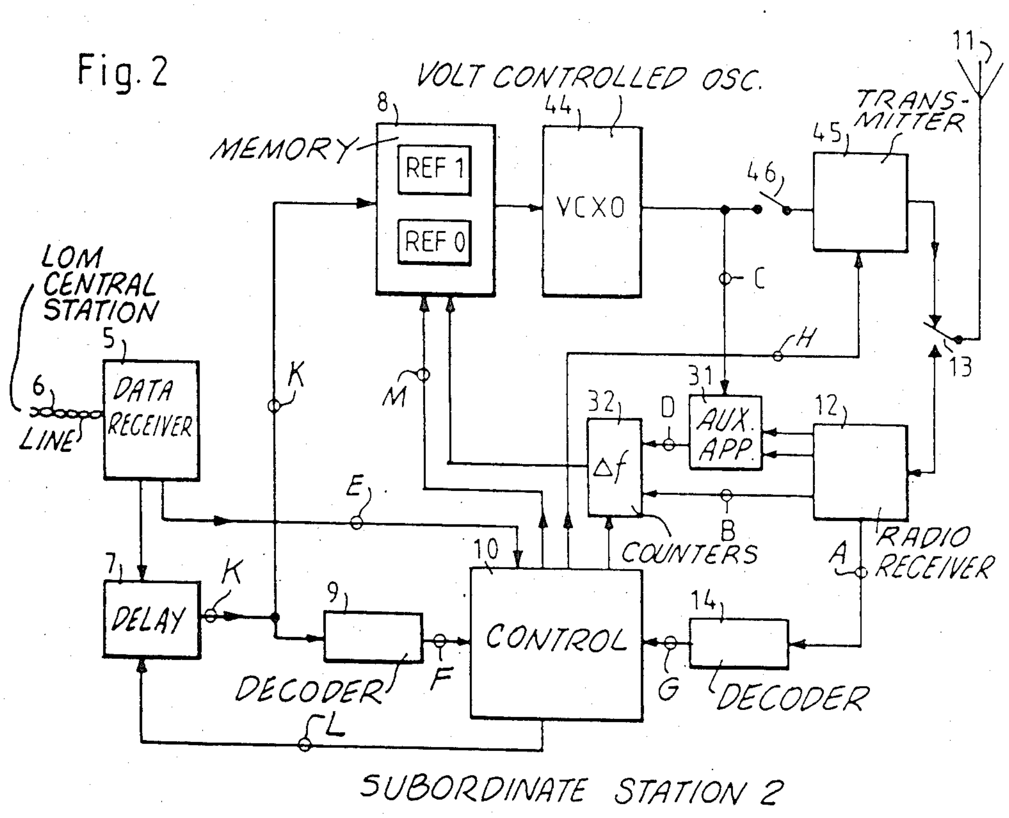
FIG. 2 is a block diagram for a subordinate radio station.

For setting the simultaneousness of transmission of the call messages in accordance with the method the present invention, a subordinate station 2, which is illustrated in FIG. 2, is equipped, inter alia, with a data receiver 5 for receiving a message sent on a line 6 from the central station 1. The message passes a delaying circuit 7 for delaying by a time TC before being fed via line K to memory 8. Memory 8 which can include a digital-to-analog converter merely converts the "1"s and "0"s of the data to one voltage or another to provide control signals for the voltage controlled oscillator 44 which feeds frequency shifted carrier signals to transmitter 45. (The time Tc is specially set for each station so that the message will be simultaneously transmitted from all stations.) In addition, the message is also transmitted from delay 7 via line K, the decoder 9 and line F to control unit 10. (Control unit 10 is a microprocessor whose operation will hereinafter be summarized by means of the flow charts shown in FIGS. 6, 7 and 8.) Control unit 10 receives control words from data receiver 5 on line E to establish the mode of operation of the station, e.g., transmit, receivers, etc. In accordance with the mode of operation, control unit 10 emits control signals on line L to delay 7, on line M to memory 8 and on line H to transmitter 45.

The station is further equipped with an antenna 11 for alternately transmitting and receiving. A radio receiver 12 can be connected to the antenna by a T/R switch 13 for reception of the same message as is received by the data receiver 5. The message received in the radio receiver is fed via a second decoder 14 to the mentioned control means 10. The control means 10 is connected to the delay circuit 7 by line L for transmitting the necessary correction for the delay time Tc. FIG. 2 further shows a synchronizer 31, a converter 32 for converting frequency differences, a voltage controlled oscillator 44, and a radio transmitter 45 and a switch 46 to control the signal input to the transmitter.

In accordance with the invention, the setting of the different radio stations to simultaneous transmission is carried out consecutively, starting with the substation closest to the central station, until setting has been carried out in the most remote station.

Figure 3:
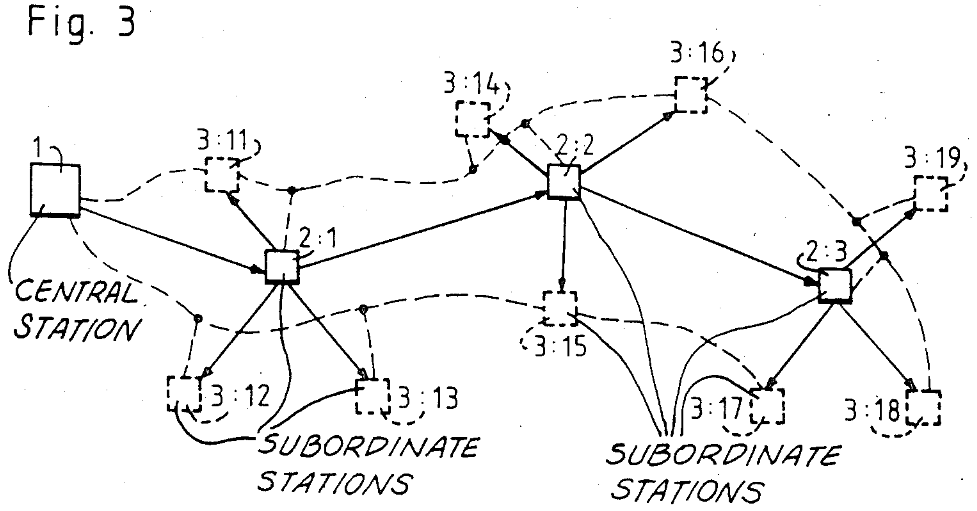
FIG. 3 illustrates a plurality of radio stations connected to a line.

The central station 1 is schematically illustrated in FIG. 3, together with a plurality of the subordinate stations. All the stations are provided with the described transmitters and receivers. Some of the subordinate stations, which may be called primary stations 2:1–2:3, are placed high so that the message can be sent by radio between such stations over fairly long distances, while other stations, which may be called secondary stations 3:11–3:19 only need to have radio communication with an adjacent primary station.

The radio connections between the stations are denoted by full lines and the wire connections by dashed lines in FIG. 3. The layout of the wire connections is optional, but all the subordinate stations must be connected to the central station 1. Transmission of personal paging calls by radio from the stations is controlled by the message sent on the line from the central station 1. The propogation time on the line is longest to the most remote station 3:19. If the call message is sent by radio from this station as soon as it has arrived on the line, the message may only be sent after a small delay after arrival at the station 2:3, in order that the message from there will be sent simultaneously. The invention directs how the delay shall be set in each radio station so that all will send the message simultaneously.

By way of example, it is chosen to set the delay in station 3:16, so that the message from there is sent simultaneously as the one sent from station 2:2. A calibration signal from the central station 1 is sent on the line, and addressed for being received by the stations 2:2 and 3:16 only, see further at line a in the time chart in FIG. 4.

Figure 4:
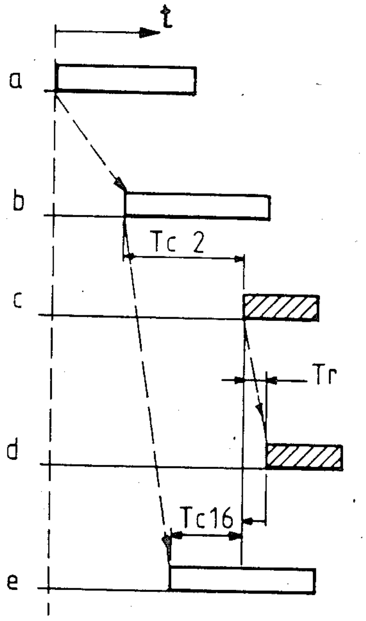
FIG. 4 illustrates a timing diagram of the setting for simultaneous transmission.

On receiving the message in station 2:2, at line b in FIG. 4, a signal is sent by this station radio transmitter after a delay of Tc2 seconds, at line c in FIG. 4, which is assumed to have been set in this station; the radio signal will be received in station 3:16 after a propagation time Tr, at line d in FIG. 4 which is known in this station. The same signal which was received on the line in the station 2:2 has also been received in the station 3:16 at a somewhat later time, at line 3 in FIG. 4. It will be seen from the diagram in the Figure that the right time delay Tc16 for setting in the station 3:16 is: The time from reception of the signal on the line to the reception of the signal by radio decreased by the known propogation time for the radio signal from the nearest preceding station.

Figure 5:
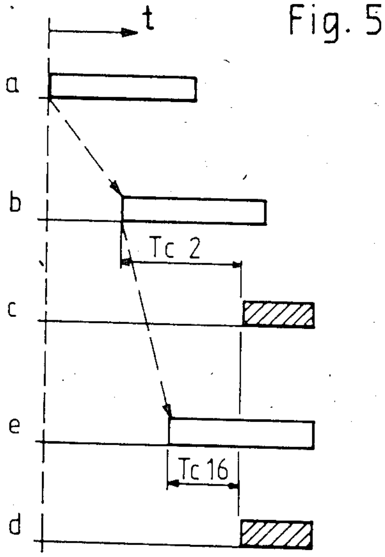
FIG. 5 illustrates a timing diagram of message transmission.

The time delay Tc16 seconds obtained for the radio transmission in station 3:16 is then used when radio signals are to be sent from this station, whether the signals are intended for personal paging as in station 3:16, or for setting simultaneousness in a subsequent station, as for the primary station 2:#, for example. The primary stations 2:1–2:3 are intended for transmission of both signals for setting simultaneousness and personal paging calls. It will be seen from FIG. 5 where the designations are the same as in FIG. 4, that with the obtained time delay setting, radio transmission is started simultaneously in stations 2:2 and 3:16. Since the stations closer to the central station have already been set for simultaneousness in pairs, all the stations will send their personal paging calls simultaneously.

The setting procedure is now repeated, initiated by transmission from the central station 1 of a message addressed to a pair of stations, where one station has been set for simultaneousness and the other is to be set. The setting is repeated in this way until it has reached all stations in the installation.

Here the objection could be made that insignificant deviations in time between two adjacent stations could be added, so that the call is sent from the last station on the line at a time deviating considerably from the one when the call was sent from the first station. Such a deviation is without importance, however, since the transmissions from stations at great distances from each other are not comprehended by the same receiver; it is sufficient that adjacent stations, the transmissions of which can be comprehended in the same receiver, send the call simultaneously.

The time delay Tc put into the first station on the line, in the central station 1, is optional. Since delay Tc decreases for each new station along the line, the selected delay must be sufficiently long so that at least some delay is left at the last station. If there is no delay left at a setting in some station, a fault signal is sent to the central station and the setting must be repeated with a greater selected value of Tc in the central station.

Figure 8:
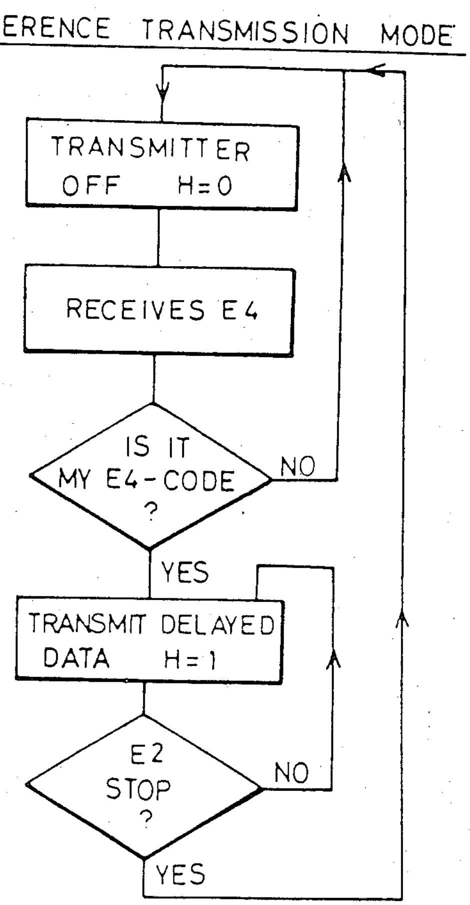
FIGS. 6, 7 and 8 are flow charts for helping to explain the operation of the system.
Figure 6:
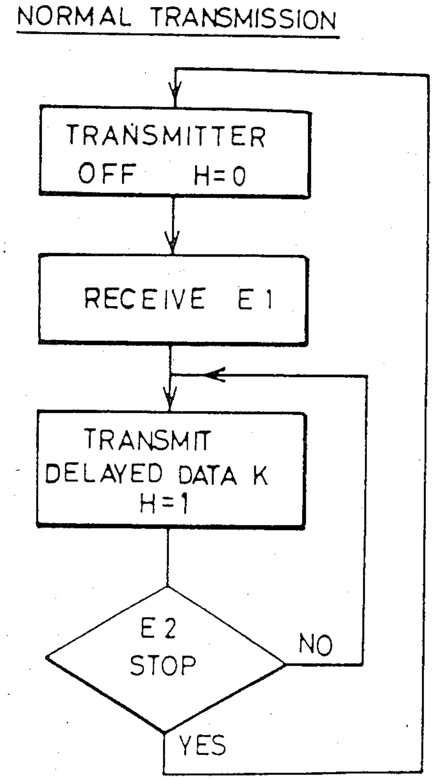
Figure 7:
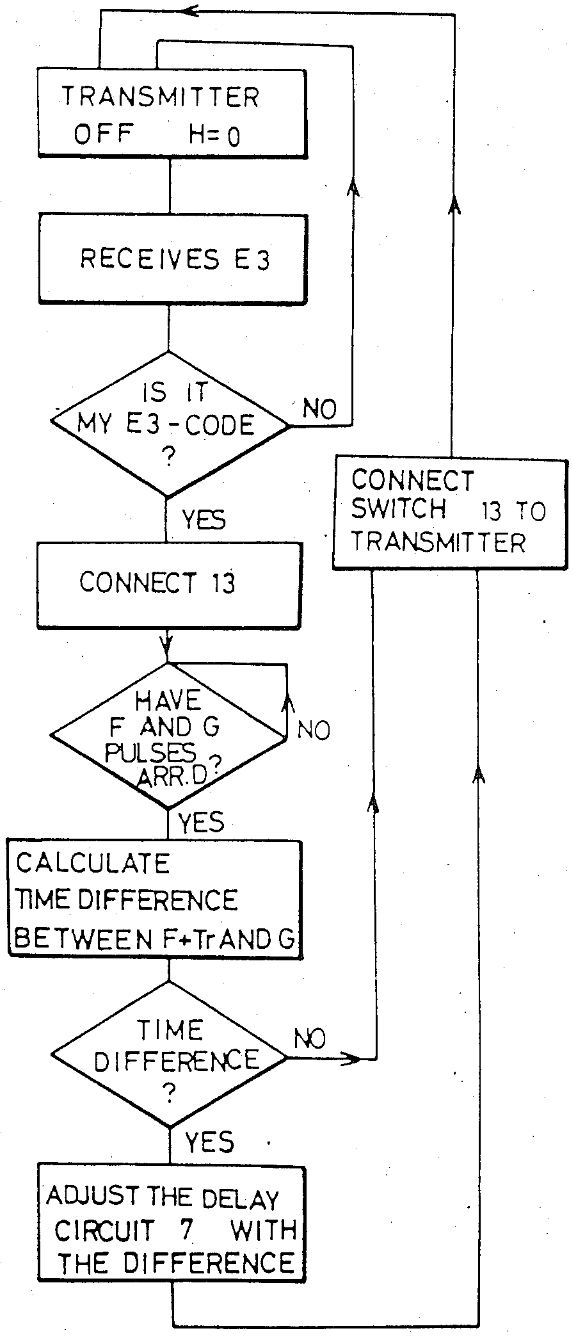

In greater detail, a microprocessor in the control unit 10 in each station controls the function of the station by delivering the following control signals in accordance with the flow charts shown in FIGS. 6, 7 and 8. Reference is made to FIG. 2. The control signals are designated by the lines which carry them E: A signal or word from the data receiver 5 with different meanings:

E1: Start transmitter

E2: Stop transmitter

E3: Go to delay adjustment mode, the signal contains a selective code, so that only the stations in which the delay shall be adjusted do respond at a specific occasion.

E4: Start transmitter as reference for adjustment; the signal contains a selective code, only recognized by one primary station at each occasion.

E5: Go into frequency adjustment mode.

F: Well defined pulse at the end of the synchronization code received via the line.

G: The same pulse as F of the synchronization code received over the radio receiver.

H: Controls on/off of the transmitter via the switch 13.

K: Delayed data to the memory 8 which converts high and low data into a suitable voltage to modulate the VCXO 44.

L: A signal to adjust the time delay at the delay circuit 7.

M: A signal from the control means 10 to the memory 8 causes the memory 8 to clock in the error signal from counter 32 and correspondingly adjust the voltage level of REF 1 if ones are received and of REF 0 if zeros are received.

A performed setting for simultaneousness must be renewed when conditions require it, e.g. when the lines are rearranged for some reason so that the paths, and thereby the propagation times of the signals are altered.

Where the installation for transmitting personal paging calls contains a large number of substations 2, these are connected together into several rows of stations with several lines, of the kind illustrated in FIG. 3.

A synchronization to the right transmission frequency is carried out immediately after the previously described setting for synchronousness in the transmission. Both settings are contained in an order included in the message. This message has the same format as a message transmitted for personal paging, but with a somewhat different content so that it is not confused with a personal paging call.

I claim:

1. In a transmission system having a central radio station and a plurality of other radio stations connected by lines to the central station, wherein each of the stations includes a transmitter for transmitting to receiving devices, the method of setting, before transmission by a plurality of the radio stations of messages generated by the central station, for synchronizing the operation of a first of said other stations to a second of said other stations at least comprising the steps of:

the central station sending on lines to said first and second other stations an order message to set for simultaneous transmission, each of said first and second other stations noting the time of receipt of said order message, said second other station radio transmitting said order message a first given period of time after the receipt thereof, said first other station noting and storing the time of arrival of said order message over the air from said second other station, said first station establishing the delay time of transmission over the air of a subsequent message received on a line, said established delay time being the difference between the time of reception via the line of said order message from the central station and the time of reception of said order message over the air from the second other station less the propogation time, stored in the first other station, for a message to be transmitted over the air from said second other station to said first other station.

2. The method of claim 1 wherein the further other stations are set in the same manner as claim 1 consecutively in the order of distance from the central station.

* * * * *